(12) United States Patent
Kondo et al.

(10) Patent No.: US 10,807,454 B2
(45) Date of Patent: Oct. 20, 2020

(54) VIBRATION ISOLATION STRUCTURE

(71) Applicants: KURASHIKI KAKO CO., LTD., Kurashiki-shi, Okayama (JP); MAZDA MOTOR CORPORATION, Hiroshima (JP)

(72) Inventors: Yoshinori Kondo, Kurashiki (JP); Kenta Okamoto, Kurashiki (JP); Masaki Aoyama, Hiroshima (JP); Tomo Fujiaki, Hiroshima (JP)

(73) Assignees: KURASHIKI KAKO CO., LTD., Kurashiki-Shi (JP); MAZDA MOTOR CORPORATION, Hiroshima (JP)

( * ) Notice: Subject to any disclaimer, the term of this patent is extended or adjusted under 35 U.S.C. 154(b) by 34 days.

(21) Appl. No.: 16/118,903

(22) Filed: Aug. 31, 2018

(65) Prior Publication Data

US 2019/0070945 A1 Mar. 7, 2019

(30) Foreign Application Priority Data

Sep. 1, 2017 (JP) .................................. 2017-168802

(51) Int. Cl.
*F16F 1/376* (2006.01)
*F16F 1/371* (2006.01)
(Continued)

(52) U.S. Cl.
CPC ............ *B60K 5/1208* (2013.01); *F16F 1/371* (2013.01); *F16F 13/101* (2013.01);
(Continued)

(58) Field of Classification Search
CPC .. F16F 1/371; F16F 1/373; F16F 1/376; F16F 13/085; F16F 13/101; F16F 13/108; B60K 5/12; B60K 5/1208
(Continued)

(56) References Cited

U.S. PATENT DOCUMENTS 4,700,933 A * 10/1987 Chikamori ............ F16F 13/262
   248/550
5,039,170 A * 8/1991 Sudano, Jr. ............ B25D 17/24
   299/37.2
(Continued)

FOREIGN PATENT DOCUMENTS

EP  1 306 576 A1  5/2003
EP  1961988 A2    8/2008
(Continued)

*Primary Examiner* — Thomas J Williams
(74) *Attorney, Agent, or Firm* — Maschoff Brennan

(57) ABSTRACT

A stopper portion includes a first protruding portion protruding from the end face of the first attachment portion closer to the outside in the main load input direction toward the outside in the main load input direction; and a second protruding portion protruding from the end face of the first attachment portion closer to the outside in the main load input direction toward the outside in the main load input direction, being spaced apart from the first protruding portion so as to be in a non-contact state with the first protruding portion, being thinner than the first protruding portion in the main load input direction, and having a protruding end in which a distance between the protruding end and the contact surface is longer in the main load input direction than a distance between a protruding end of the first protruding portion and the contact surface.

7 Claims, 11 Drawing Sheets

(51) Int. Cl.
*B60K 5/12* (2006.01)
*F16F 13/10* (2006.01)

(52) U.S. Cl.
CPC ............ *F16F 13/108* (2013.01); *F16F 1/376* (2013.01); *F16F 2224/025* (2013.01); *F16F 2230/007* (2013.01)

(58) Field of Classification Search
USPC ......... 267/140.13, 140.14, 140.15, 292, 153, 267/141–141.4
See application file for complete search history.

(56) References Cited

U.S. PATENT DOCUMENTS

| | | | | |
|---|---|---|---|---|
| 7,922,157 | B2* | 4/2011 | Hayashi | ................ F16F 1/3828 267/141.2 |
| 8,939,437 | B2* | 1/2015 | Kobori | ................ F16F 1/3735 267/141 |
| 9,302,698 | B2* | 4/2016 | Enomoto | ............... B62D 3/126 |
| 2006/0043656 | A1* | 3/2006 | Shimizu | ................ F16F 1/3849 267/140.11 |
| 2006/0261529 | A1 | 11/2006 | Yamamoto et al. | |
| 2009/0008504 | A1 | 1/2009 | Camarasa | |
| 2015/0252871 | A1* | 9/2015 | Kondo | ..................... F16F 1/36 267/141 |
| 2016/0053848 | A1 | 2/2016 | Nakamura | |
| 2017/0219046 | A1* | 8/2017 | Kojima | ................... B60K 5/12 |
| 2017/0299013 | A1 | 10/2017 | Kojima | |

FOREIGN PATENT DOCUMENTS

| | | | | |
|---|---|---|---|---|
| EP | 2019227 A1 | * | 1/2009 | ........... B60K 5/1208 |
| EP | 3184853 A1 | | 6/2017 | |
| FR | 2971459 A1 | | 8/2012 | |
| GB | 1525776 A | * | 9/1978 | ............. F16F 1/376 |
| JP | S61-92329 A | | 5/1986 | |
| JP | 2006-250209 A | | 9/2006 | |
| JP | 2006-283870 A | | 10/2006 | |
| JP | 2008-202765 A | | 9/2008 | |
| JP | 2009-1085 A | | 1/2009 | |
| JP | 2009-14080 A | | 1/2009 | |
| JP | 2009-264517 A | | 11/2009 | |
| JP | 2012-87894 A | | 5/2012 | |
| JP | 2016-75321 A | | 5/2016 | |
| JP | 2016-75322 A | | 5/2016 | |
| WO | 2006/067849 A1 | | 6/2006 | |

* cited by examiner

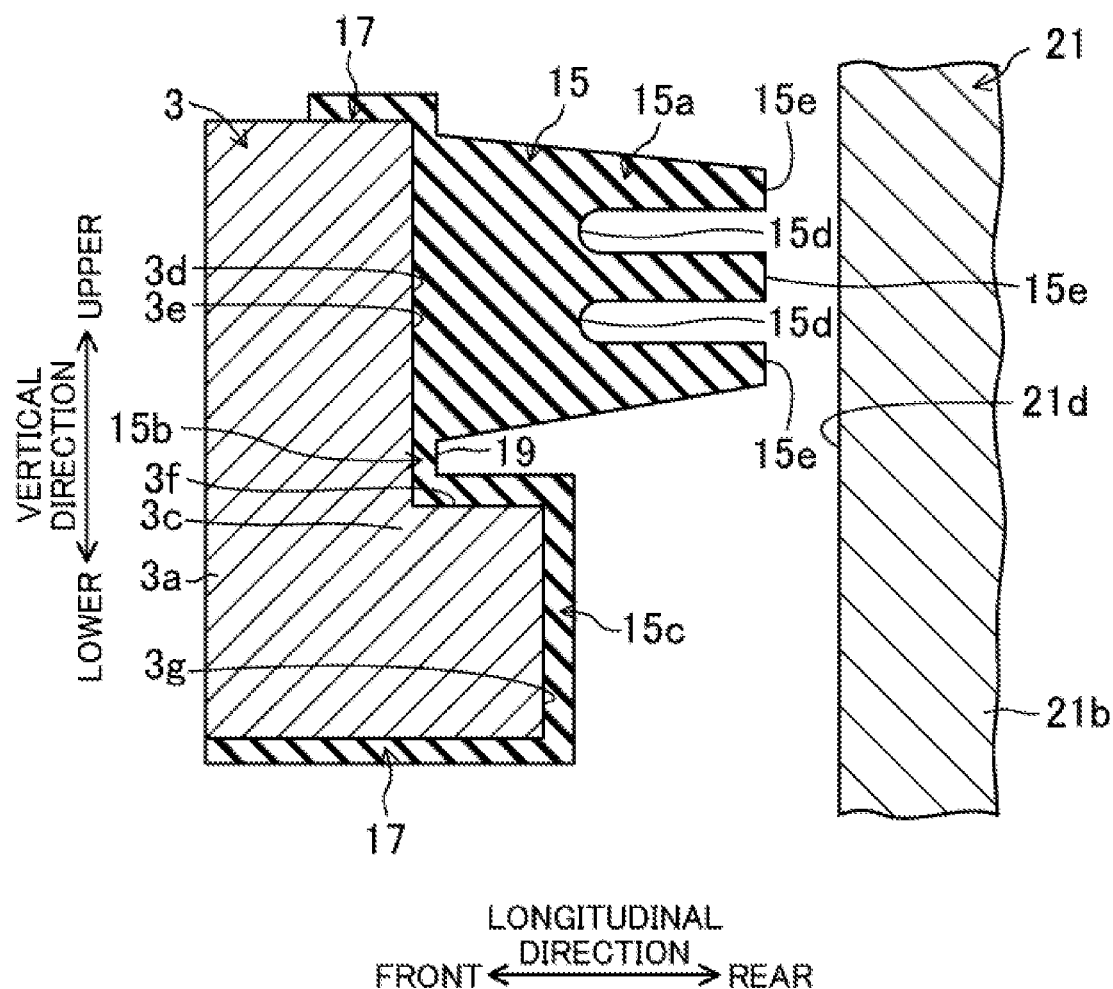

VIBRATION ISOLATION STRUCTURE

CROSS-REFERENCE TO RELATED APPLICATION

This application claims priority to Japanese Patent Application No. 2017-168802 filed on Sep. 1, 2017, the entire disclosure of which is incorporated by reference herein.

BACKGROUND

The present disclosure relates to a vibration isolation structure.

An example of a typical vibration isolation structure of this type includes a liquid-filled type vibration isolation device including a main spring portion in which an attachment metal fitting (a second attachment member) attached to a vehicle body side (a vibration receiving side) and a cylindrical body are connected together by a rubber elastic body, and an engine bracket in which a substantially cylindrical casing portion (a first attachment member) having a through hole is integrated with an attachment portion for attaching the casing portion to an engine side (a vibration origin side). Then, the cylindrical body is press-fitted into the through hole to form a liquid chamber which includes a wall portion partially comprised of the rubber elastic body and an inner peripheral surface of the casing portion, and of which the volume is variable.

In addition, the liquid-filled type vibration isolation device of this type might include the casing portion having a stopper rubber (a stopper part). Then, for example, when a large driving reaction force acts at the time of a rapid acceleration of the vehicle and then the engine or the like is forced to be vibrated, the stopper rubber comes into contact with a member (a contact member) on the vehicle body side to restrict the deformation of the rubber elastic body in the longitudinal direction (the main load input direction) of the vehicle. For example, Japanese Patent No. 5610972 (paragraph [0055] and FIG. 12(a)) discloses a liquid-filled vibration isolation device in which a rubber elastic body and a stopper rubber are simultaneously molded on an engine bracket.

SUMMARY

To restrict vibration in the vertical direction (a direction orthogonal to the main load input direction) from the vibration origin side to the vibration receiving side in a state in which a stopper portion is in contact with the contact member, the stopper portion in the contact state is required to have a small dynamic spring constant in the vertical direction.

On the other hand, even when a heavy load is input, a rubber elastic body is required not to considerably deform, and the displacement of a vibration origin is required to be reduced.

Here, in Japanese Patent No. 5610972, the entire surface of the stopper rubber comes into contact with a member on the vehicle body side, and thus the stopper rubber in the contact state has a large dynamic spring constant in the vertical direction.

Thus, it is conceivable that the stopper rubber has a deformable thick shape so as to exhibit soft spring characteristics. However, in such a case, when a heavy load is input in the longitudinal direction, the rubber elastic body considerably deforms, and the displacement of an engine cannot be reduced.

It is an object of the present disclosure to provide a technique in which a stopper portion being in contact with a contact member has a small dynamic spring constant in a direction orthogonal to a main load input direction, whereas, even when a heavy load is input in the main load input direction, a rubber elastic body does not considerably deform, and the displacement of a vibration origin is reduced.

The present disclosure is directed to a vibration isolation structure including a first attachment member attached to a vibration origin side; a second attachment member attached to a vibration receiving side; a rubber elastic body provided between the first attachment member and the second attachment member; a stopper portion made of rubber, provided on an end face of the first attachment member closer to an outside in a main load input direction, and restricting deformation of the rubber elastic body in the main load input direction; and a contact member provided on the vibration receiving side and having a contact surface which faces the stopper portion in the main load input direction and which the stopper portion comes into contact with at a time of input of a load in the main load input direction. The stopper portion includes a first protruding portion protruding from the end face of the first attachment portion closer to the outside in the main load input direction toward the outside in the main load input direction, and a second protruding portion protruding from the end face of the first attachment portion closer to the outside in the main load input direction toward the outside in the main load input direction, being spaced apart from the first protruding portion so as to be in a non-contact state with the first protruding portion, being thinner than the first protruding portion in the main load input direction, and having a protruding end in which a distance between the protruding end and the contact surface is longer in the main load input direction than a distance between a protruding end of the first protruding portion and the contact surface. Even if the first protruding portion is deformed by coming into contact with the contact surface at a time of input of a load in the main load input direction, the non-contact state between the first protruding portion and the second protruding portion is maintained at least until the second protruding portion comes into contact with the contact surface.

According to the present disclosure, a stopper portion being in contact with a contact member has a small dynamic spring constant in a direction orthogonal to a main load input direction, whereas, even when a heavy load is input in the main load input direction, the rubber elastic body does not considerably deform, and the displacement of the vibration origin can be reduced.

BRIEF DESCRIPTION OF THE DRAWINGS

FIG. 15 is a view corresponding to FIG. 4 and schematically shows a vibration isolation structure according to a ninth variation.

DESCRIPTION OF EMBODIMENTS

Figure 1:
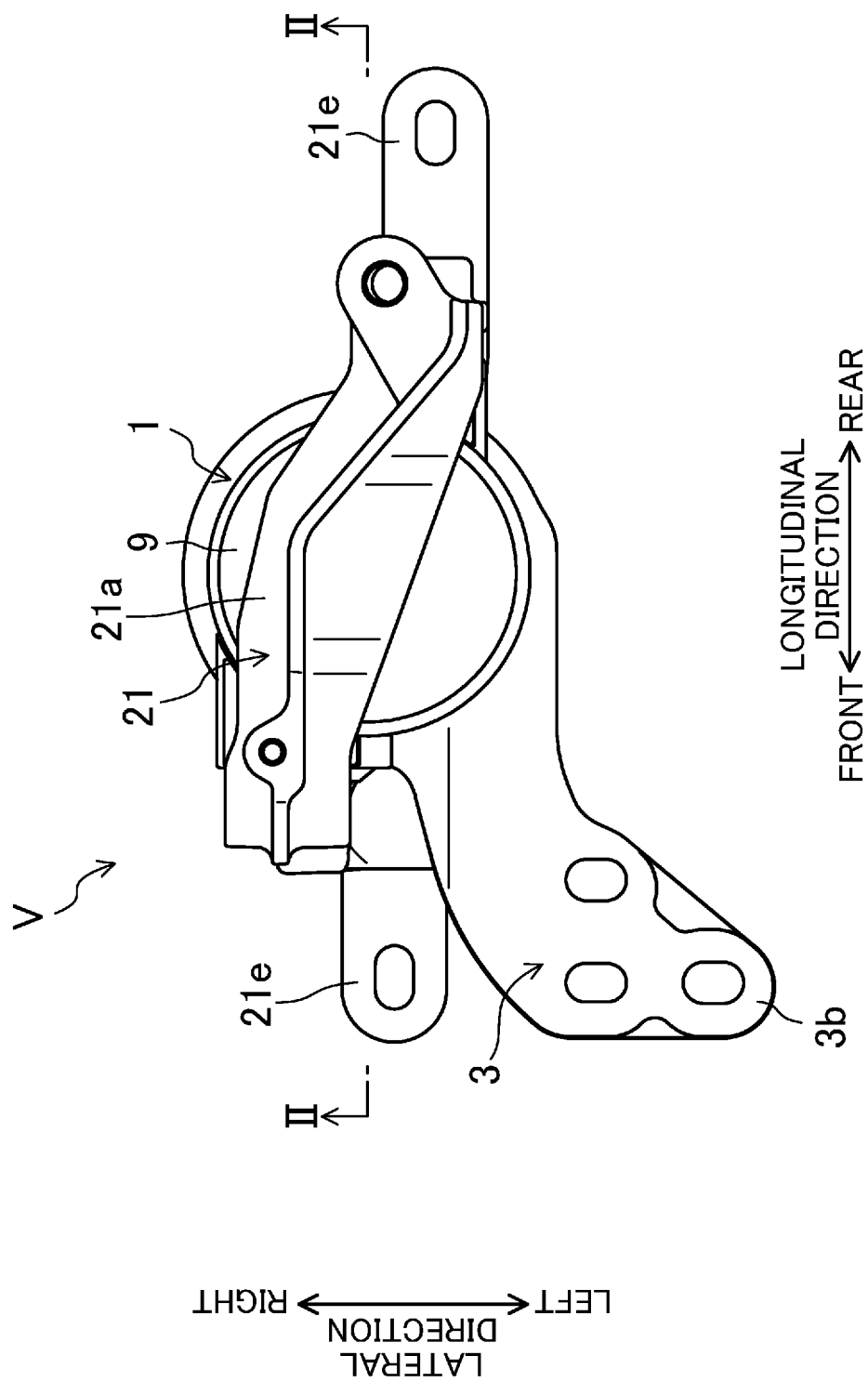
FIG. 1 is a plan view showing a vibration isolation structure according to an exemplary embodiment.
Figure 2:
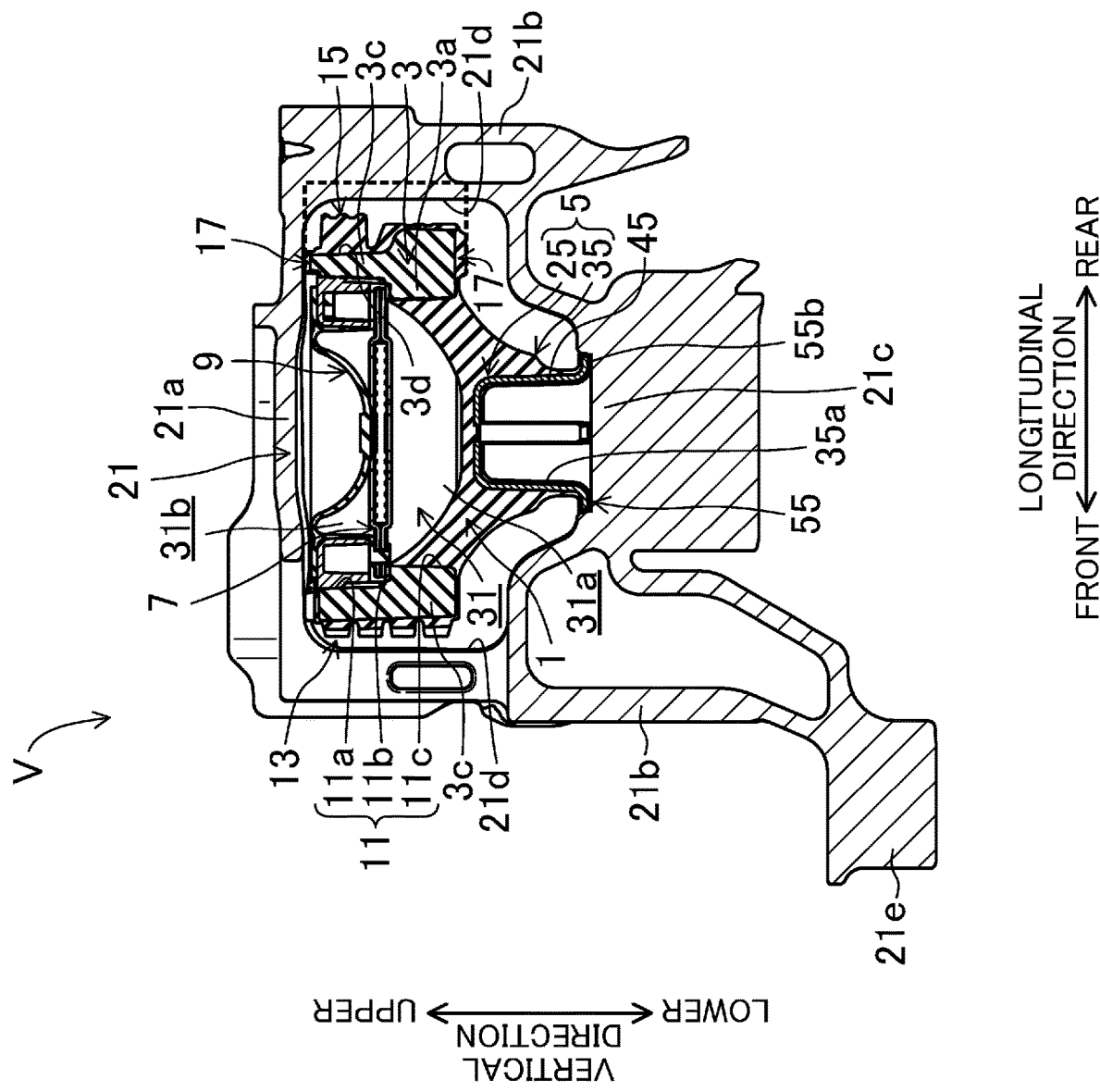
FIG. 2 is a cross-sectional view taken along the line II-II of FIG. 1.
Figure 3:
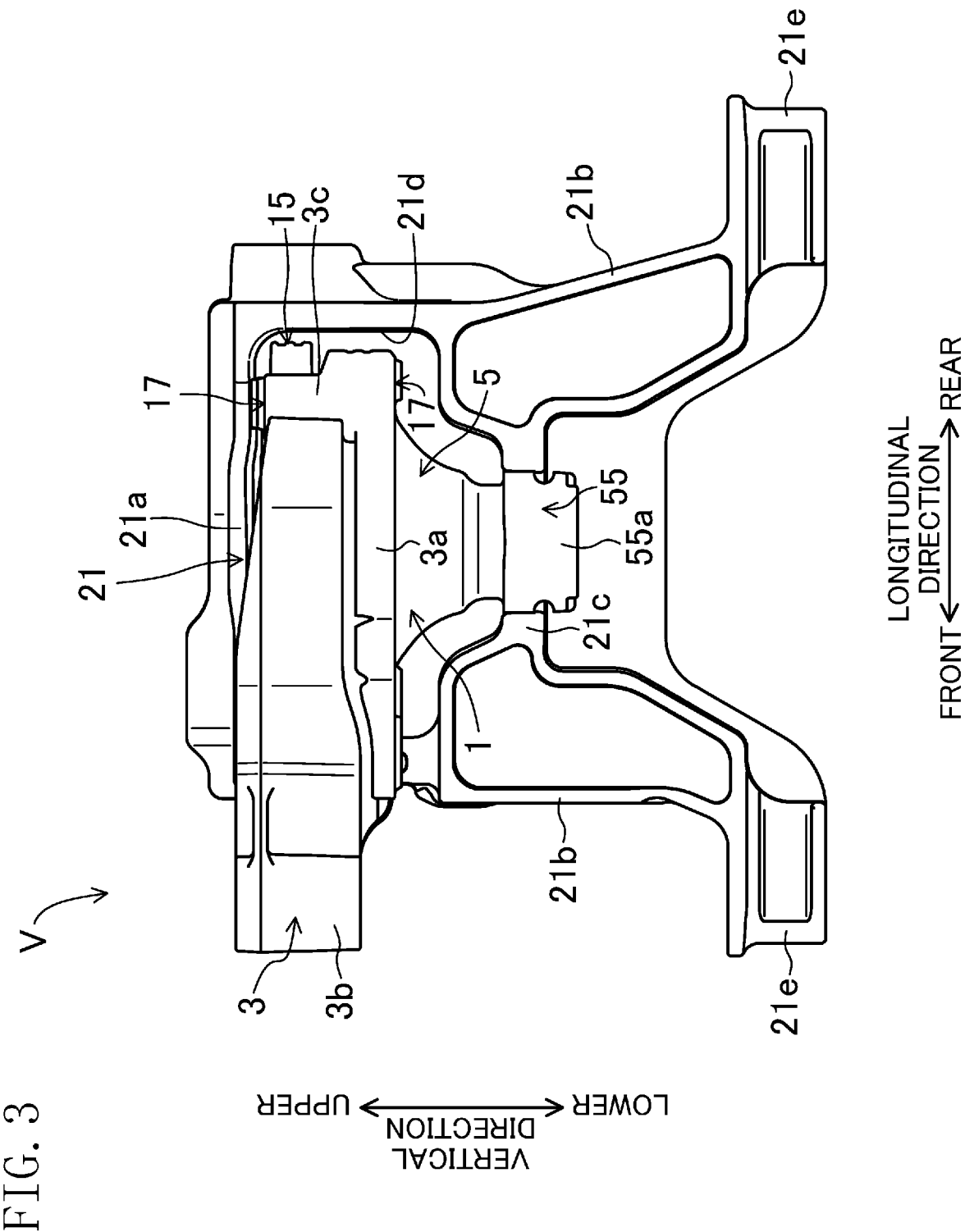
FIG. 3 is a front view showing the vibration isolation structure.
Figure 4:
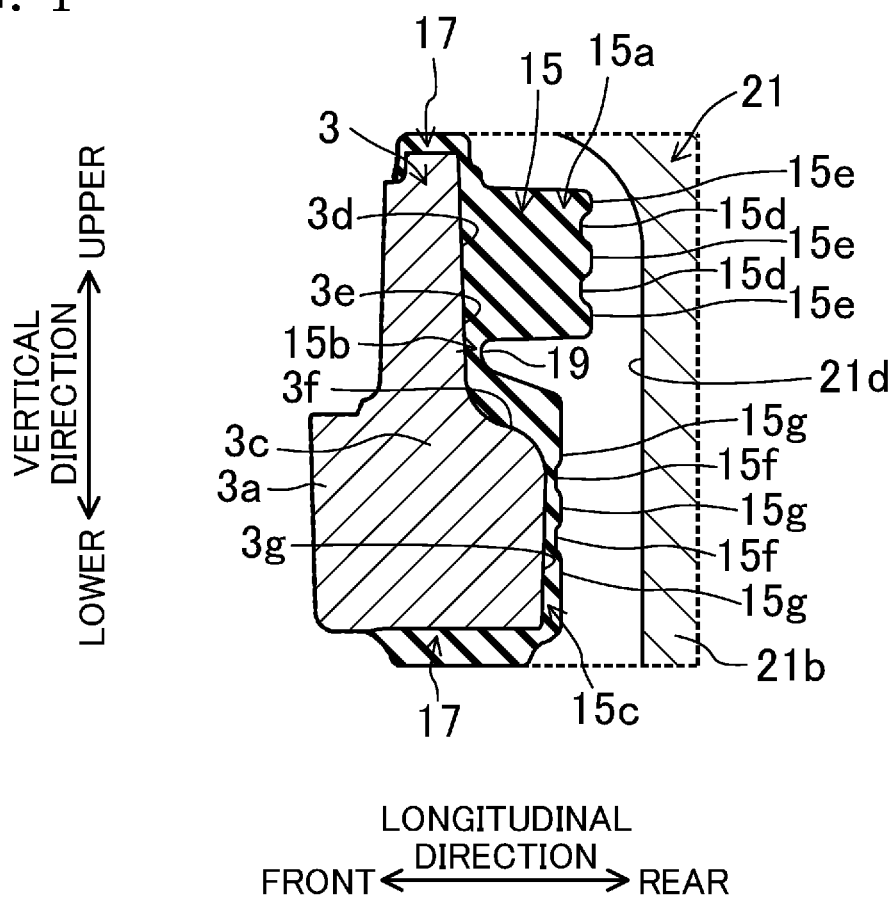
FIG. 4 is an enlarged view of a portion surrounded by a broken line in FIG. 2.

Exemplary embodiments will now be described in detail with reference to the drawings. The following description of exemplary embodiments is only an example in nature, and is not intended to limit the scope, applications or use of the present disclosure.

—Overall Structure—

FIGS. 1 to 4 illustrate a vibration isolation structure of this embodiment. This vibration isolation structure V is configured by fixing a liquid-filled type vibration isolation device 1 to an attachment bracket 21 (an attachment member, a member on the vibration receiving side). This liquid-filled type vibration isolation device 1 includes: an engine bracket 3 having a hollow portion 11 and attached on a power plant (not shown) (on the vibration origin side, namely on the engine side) configured by coupling an engine and a transmission; a main spring portion 5 attached to a lower side (on one side in the cylinder axis direction) of the hollow portion 11; an orifice plate 7 inserted into the hollow portion 11 from the upper side (the other side in the cylinder axis direction); a diaphragm 9 press-fitted into the hollow portion 11 from the upper side to overlap the orifice plate 7; a front stopper rubber 13 attached to a front portion (a portion on one side in the cylinder radial direction) of the engine bracket 3; a rear stopper rubber (a stopper portion) 15 attached to a rear portion (a portion on the other side in the cylinder radial direction) of the engine bracket 3; and upper and lower stopper rubbers 17 attached to upper and lower portions of the engine bracket 3, respectively.

The main spring portion 5 includes a metal inner plate (a second attachment member) 25 coupled to the vehicle body side (the vibration receiving side), and a rubber elastic body 35 vulcanized to bond and couple the hollow portion 11 and the inner plate 25. The main spring portion 5 is attached to the engine bracket 3. Then, the liquid-filled type vibration isolation device 1 of this embodiment is attached to the power plant and the vehicle body so that the cylinder axis direction of the core portion 45 described later is directed in the vertical direction, and that the pair of front and rear stopper rubbers 13, 15 face each other in the longitudinal direction of the vehicle (hereinafter referred to as the longitudinal direction). The pair of front and rear stopper rubbers 13, 15, the upper and lower stopper rubbers 17, and the rubber elastic body 35 are simultaneously molded on the engine bracket 3.

In this liquid-filled type vibration isolation device 1, a cavity defined by an inner peripheral surface of the engine bracket 3, the main spring portion 5 (specifically, the rubber elastic body 35), and the diaphragm 9 is filled with a buffer solution such as ethylene glycol. This cavity serves as a liquid chamber 31 for absorbing and alleviating vibration, of the power plant, which is input to the rubber elastic body 35. Then, the inside of this liquid chamber 31 is partitioned into an upper side and lower side by the orifice plate 7. The lower side serves as a pressure receiving chamber 31a of which the volume increases or decreases according to deformation of the rubber elastic body 35. The upper side of the liquid chamber 31 serves as an equilibrium chamber 31b of which the volume increases or decreases according to deformation of the diaphragm 9 and which absorbs the volume variation in the pressure receiving chamber 31a.

This liquid-filled type vibration isolation device 1 is attached to the vehicle body via the substantially inverted U-shaped attachment bracket 21 attached to a vehicle body side frame (not shown) so as to straddle the liquid-filled type vibration isolation device 1 in the longitudinal direction above the liquid-filled type vibration isolation device 1, thereby elastically supporting the power plant. This attachment bracket 21 includes an upper beam portion 21a extending substantially horizontally in the longitudinal direction above the liquid-filled vibration isolation device 1; a pair of front and rear leg portions 21b extending downward from front and rear end portions of the upper beam portion 21a, respectively; and a lower beam portion 21c extending substantially horizontally in the longitudinal direction below the liquid-filled type vibration isolation device 1 to couple the legs 21b. The pair of front and rear leg portions 21b each includes an inner surface. All or part of the inner surface serves as a contact surface 21d facing a respective one of the pair of front and rear stopper rubbers 13, 15 in the longitudinal direction (the main load input direction). The contact surface 21d is a plane extending in the vertical direction (the direction orthogonal to the main load input direction). The pair of front and rear leg portions 21b each include a lower end portion 21e fastened on the side frame. The liquid-filled type vibration isolation device 1 is attached to the attachment bracket 21 because the inner plate 25 of the main spring portion 5 is fixed to the lower beam portion 21c.

Thus, for example, when the car is stopped and the engine is in an idling state, the rubber elastic body 35 in this liquid-filled type vibration isolation device 1 absorbs low-frequency idling vibrations caused by torque fluctuation or the like, thereby reducing vibration transmission to the vehicle body. On the other hand, for example, when a large driving reaction force (torque) acts at the time of a rapid acceleration of the vehicle and then the power plant is forced to be vibrated longitudinally, the p air of front and rear stopper rubbers 13, 15 come into contact with the front leg portion 21b and the rear leg portion 21b of the attachment bracket 21, respectively, and the longitudinal deformation of the rubber elastic body 35 is restricted. When the power plant is forced to be vibrated vertically, the upper and lower stopper rubbers 17 come into contact with the upper beam portion 21a and the lower beam portion 21c of the attachment bracket 21, respectively, and the vertical deformation of the rubber elastic body 35 is restricted.

—Engine Bracket Etc.—

The engine bracket 3 is made of an aluminum alloy, and the engine bracket 3 includes the hollow portion 11 that extends in the vertical direction and to which the main spring portion 5 etc. is attached as described above. In other words, this engine bracket 3 is shaped so that a substantially cylindrical casing portion (first attachment member) 3a having the hollow portion 11 is integrated with an attachment portion 3b for attaching the casing portion 3a to the power plant. The casing portion 3a includes a pair of attachment base portions 3c, each projecting outward in the longitudinal direction from the outer peripheral surface of the casing portion 3a and having an end face that extends in the vertical direction and faces outward in the longitudinal direction. The pair of attachment base portions 3c is for attaching the pair of front and rear stopper rubbers 13, 15, and face each other in the longitudinal direction. The rear attachment base portion 3c includes a rear end face 3d having: a first rear end face (first end face) 3e being flat and extending in the vertical direction; and a second rear end face (second end face) 3g being continuous with a lower end portion of the first rear end face 3e via a step portion 3f, located behind the first rear end face 3e (located closer to the outside in the longitudinal direction), being flat, and extending in the vertical direction. The attachment base portion 3c includes an upper surface and a lower surface on which upper and lower stopper rubbers 17 are formed, respectively.

The hollow portion 11 of the casing portion 3a includes an upper hollow portion 11a into which the orifice plate 7 and the diaphragm 9 are inserted, and a lower hollow portion 11c which is continuous with the upper hollow portion 11a via a step portion 11b and to which the main spring portion 5 is attached. Then, the inner diameter of the upper hollow portion 11a is larger than that of the lower hollow portion 11c.

The disc-shaped orifice plate 7 is disposed on and above the step portion 11b, and the substantially hat-shaped rubber diaphragm 9 is disposed to cover the entirety of the orifice plate 7 from thereabove. An outer peripheral portion of this diaphragm 9 is press-fitted into the upper hollow portion 11a from above such that the diaphragm 9 is fitted and fixed into the engine bracket 3.

The orifice plate 7 includes a circular orifice passage (not shown) extending in the circumferential direction. One end of the orifice passage faces and opens to the pressure receiving chamber 31a on the lower side of the liquid chamber 31, whereas the other end of the orifice passage faces and opens to the equilibrium chamber 31b on the upper side of the liquid chamber 31. Then, the buffer liquid flows between the pressure receiving chamber 31a and the equilibrium chamber 31b via the orifice passage such that the vibration having a low frequency and acting on the pressure receiving chamber 31a from the rubber elastic body 35 is attenuated.

—Main Spring Portion—

The inner plate 25 of the main spring portion 5 includes an attachment plate portion 55 having a substantially L-shaped cross section and having a substantially rectangular bottom plate portion 55b and a side plate portion 55a extending downward from a side edge on one side in the longer direction of the bottom plate portion 55b, and a core portion 45 having a substantially closed-top cylindrical shape in which the bottom plate portion 55b of the attachment plate portion 55 bulges upward. The rubber elastic body 35 is interposed between the outer peripheral surface of the core portion 45 and the inner peripheral surface of the lower hollow portion 11c corresponding to the outer peripheral surface. On the other hand, by folding the side edge portion on the other side in the longer direction of the bottom plate portion 55b, the attachment plate portion 55 is attached to the lower beam portion 21c from above so as to laterally sandwich the lower beam portion 21c of the attachment bracket 21 together with the side plate portion 55a.

A mortar-shaped recess portion 35a is formed on the lower inner peripheral side of the rubber elastic body 35, and the peripheral surface of the recess portion 35a is bonded to the outer peripheral surface of the core portion 45. The rubber elastic body 35 expands radially outward from the entire periphery of the core portion 45 and has a substantially truncated cone shape extending obliquely upward. The outer peripheral surface of the upper portion thereof is bonded to the inner peripheral surface of the lower hollow portion 11c. The upper portion of the rubber elastic body 35 bonded and fixed to the inner periphery of the lower hollow portion 11c in this manner has a comparatively thick cylindrical shape which opens upward. Then, the liquid-filled type vibration isolation device 1 contains the liquid chamber 31 which includes a wall portion partially comprised of the rubber elastic body 35 and the inner peripheral surface of the lower hollow portion 11c and of which the volume is variable.

—Rear Stopper Rubber—

The rear stopper rubber 15 includes a first protruding portion 15a protruding rearward (toward the outside in the main load input direction) from the first rear end face 3e of the rear attachment base portion 3c and having a substantially rectangular cross section extending in a direction (hereinafter referred to as the lateral direction) orthogonal to the vertical direction and the longitudinal direction; and a second protruding portion 15a being continuous with a lower end portion of the first protruding portion 15a via a covered portion 15b, protruding rearward from the second rear end face 3g of the rear attachment base portion 3c, and having a substantially rectangular cross section extending in the lateral direction.

Three ridge portions 15e extending in the lateral direction are formed on a protruding end face (a rear end face) of the first protruding portion 15a extending in the vertical direction so as to form two groove portions 15d. The presence of the groove portions 15d reduces the contact area between the protruding end face of the first protruding portion 15a and the contact surface 21d of the rear leg portion 21b at the time of input of the load in the longitudinal direction. Consequently, noises are reduced which are generated by repeated separation and contact between the protruding end face of the first protruding portion 15a and the contact surface 21d.

The second protruding portion 15c serves as a displacement regulating portion for reducing displacement of the power plant (this detail will be described later). The second protruding portion 15c is spaced apart in the vertical direction from the first protruding portion 15a so as to be in a non-contact state with the first protruding portion 15a. In other words, the second protruding portion 15c is disposed so that a groove portion 19 extending in the lateral direction is formed between the second protruding portion 15c and the first protruding portion 15a. The non-contact state between the first protruding portion 15a and the second protruding portion 15c is maintained at all times even if the first protruding portion 15a and the second protruding portion 15c are deformed by coming into contact with the contact surface 21d of the rear leg portion 21b at the time of input of the load in the longitudinal direction.

The second protruding portion 15c is thinner than the first protruding portion 15a in the longitudinal direction and has a smaller cross-sectional area than the first protruding portion 15a. That is, the first protruding portion 15a is relatively greater in the thickness in the longitudinal direction and in the cross-sectional area. Thus, the first protruding portion 15a has a rubber volume and exhibits soft spring characteristics. In other words, the first protruding portion 15a is a large block having a rubber volume. In contrast, the second protruding portion 15c is relatively smaller in the thickness in the longitudinal direction and in the cross-sectional area. Thus, the second protruding portion 15c does not have a rubber volume and exhibits hard spring characteristics. In other words, the second protruding portion 15c is a small block (small protrusion) not having a rubber volume.

The protruding end face, of the second protruding portion 15c, extending in the vertical direction is located in front of the protruding end face of the first protruding portion 15a. In other words, in the longitudinal direction, the distance between the protruding end face of the second protruding portion 15c and the contact surface 21d of the rear leg portion 21b is longer than the distance between the protruding end face of the first protruding portion 15a and the contact surface 21d.

Three ridge portions 15g extending in the lateral direction are formed on the protruding end face of the second protruding portion 15c so as to form two groove portions 15f. The presence of the groove portions 15f reduces the contact area between the protruding end face of the second protruding portion 15c and the contact surface 21d of the rear leg portion 21b at the time of input of the load in the longitudinal direction. Consequently, noises are reduced which are generated by repeated separation and contact between the second protruding portion 15c and the contact surface 21d.

Figure 5:
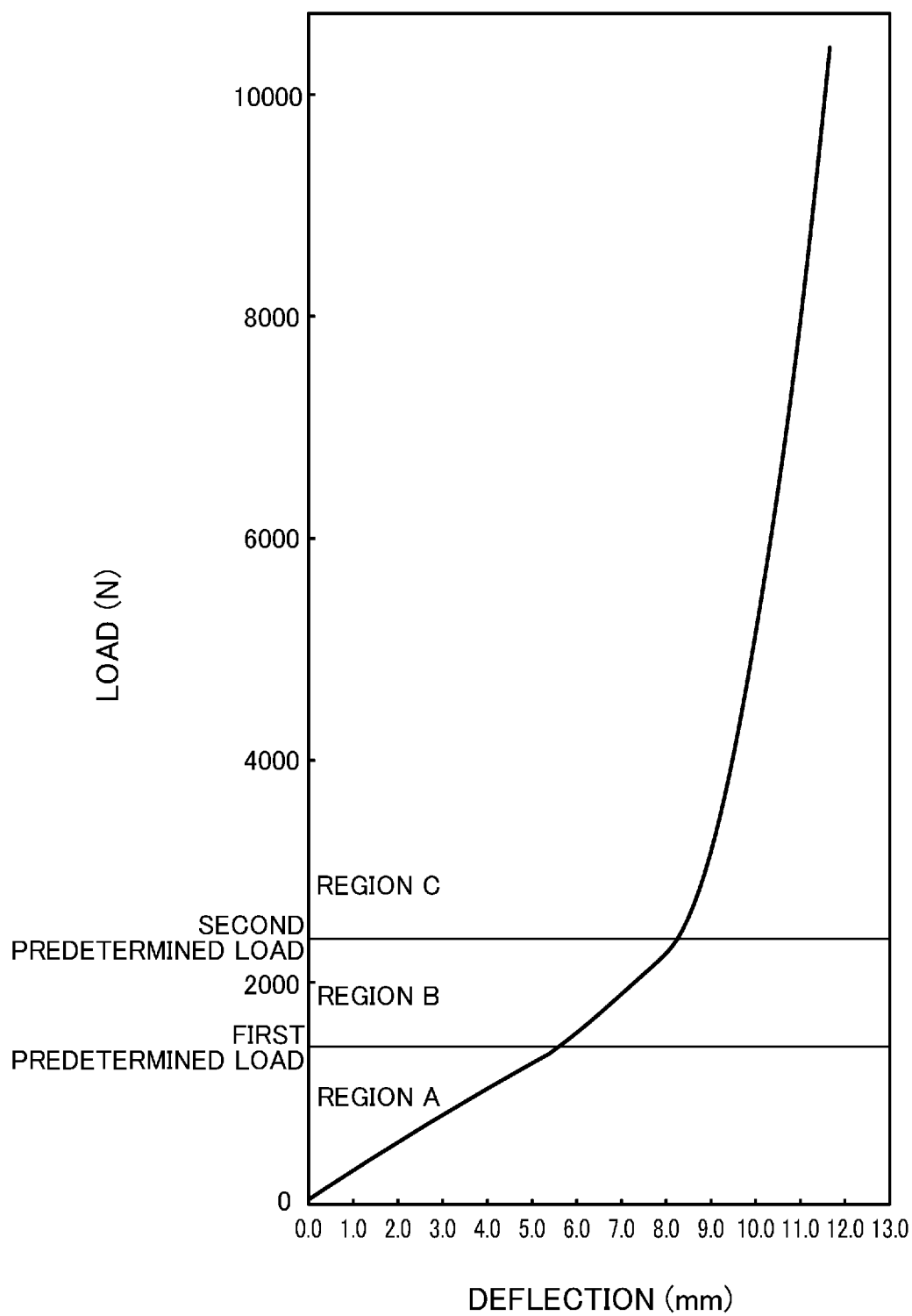
FIG. 5 is a graph showing a load-deflection curve of a liquid-filled type vibration isolation device.

Here, for example, when the load is input in the longitudinal direction at the time of rapid acceleration of the vehicle, the first protruding portion 15a and the second protruding portion 15c do not come into contact with the contact surface 21d of the rear leg portion 21b until the input load exceeds a first predetermined load (see FIG. 5).

When the input load increases and exceeds the first predetermined load, only the first protruding portion 15a comes into contact with the contact surface 21d of the rear leg portion 21b. The first protruding portion 15a exhibits soft spring characteristics, and thus is considerably deformed. The non-contact state between the first protruding portion 15a and the second protruding portion 15c is maintained (the groove 19 between the first protruding portion 15a and the second protruding portion 15c is not filled) even after the input load exceeds the first predetermined load, and thus the deformation of the first protruding portion 15a continues. The second protruding portion 15c does not come into contact with the contact surface 21d of the rear leg portion 21b until the input load exceeds a second predetermined load larger than the first predetermined load (e.g., approximately 2000 N; see FIG. 5). The second predetermined load is set to the maximum load required to restrict a muffled sound caused by the transmission of the gear noise vibration to the vehicle body. This maximum load depends on the weight of the engine etc.

When the input load increases and exceeds the second predetermined load, the second protruding portion 15c also comes into contact with the contact surface 21d of the rear leg portion 21b before the first protruding portion 15a is deformed too much (completely crushed). In other words, the second protruding portion 15c also comes into contact with the contact surface 21d of the rear leg portion 21b after an appropriate degree of deformation of the first protruding portion 15a. The second protruding portion 15c exhibits hard spring characteristics, and thus is not considerably deformed. The non-contact state between the first protruding portion 15a and the second protruding portion 15c is maintained even after the input load exceeds the second predetermined load, and thus the first protruding portion 15a does not deform so as to escape in the vertical direction. Thus, the rear stopper rubber 15 exhibits hard spring characteristics.

FIG. 5 is a graph showing a load-deflection curve of the liquid-filled type vibration isolation device 1 obtained from the results of actual product measurements. The solid line in this figure shows a load-deflection curve obtained when a load is applied to the liquid-filled type vibration isolation device 1 of this embodiment. From this figure, it has been found that in the liquid-filled type vibration isolation device 1 of this embodiment, the first protruding portion 15a and the second protruding portion 15c neither come into contact nor deform in a region (a region A) where the input load is small, thereby exhibiting soft spring characteristics; only the first protruding portion 15a comes into contact and deforms as the input load increases (a region B), thereby exhibiting soft spring characteristics; and the second protruding portion 15c also comes into contact and deforms as the input load further increases (a region C), thereby exhibiting hard spring characteristics.

TABLE 1

| Input Load | Compressive Distortion (Average Value) |
| --- | --- |
| First Predetermined Load | 0.16 |
| Second Predetermined Load | 0.22 |
| Approx. 10000N | 0.55 |

Table 1 shows a relation, obtained from a simulation in which the load is applied to the liquid-filled type vibration isolation device 1 of this embodiment, between the input load and the compressive distortion (deformation amount/thickness) of the first protruding portion 15a. It has been found that the compression distortion of the first protruding portion 15a is 0.16 on average when the input load exceeds the first predetermined load and only the first protruding portion 15a comes into contact; 0.22 on average when the input load exceeds the second predetermined load and the second protruding portion 15c also starts to come into contact; and 0.55 on average when the input load further increases to approximately 10000 N.

Accordingly, the liquid-filled type vibration isolation device 1 having the following three-step stopper characteristics can be achieved: the region (the region A) where, even when a load is input, the first protruding portion 15a and the second protruding portion 15c do not deform and the rubber elastic body 35 absorbs the impact; the region (the region B) where the first protruding portion 15a deforms appropriately to absorb the impact when a load is input; and the region (the region C) where the second protruding portion 15c does not considerably deform even when a load is input.

Figure 6:
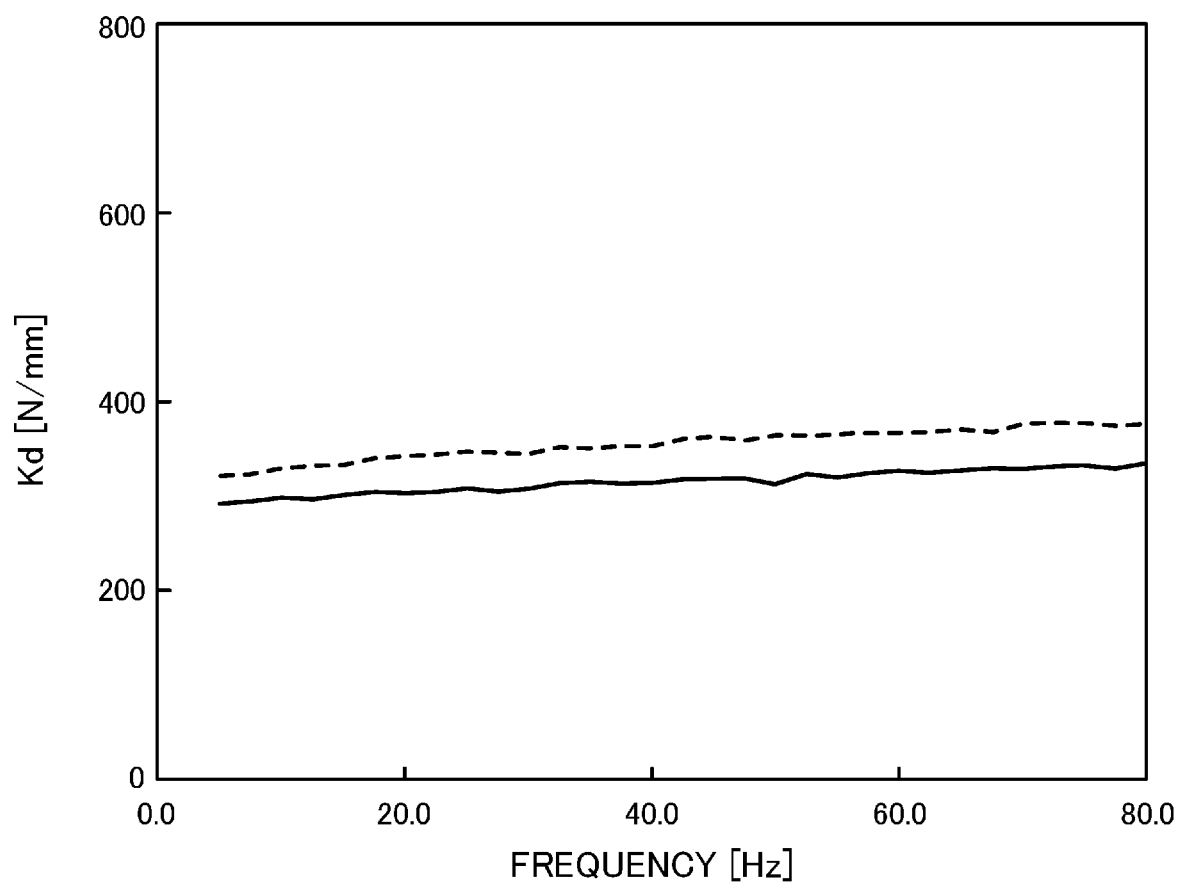
FIG. 6 is a graph showing a relation between the dynamic spring constant in the vertical direction of a rear stopper rubber in the contact state and the frequency.

FIG. 6 is a graph showing a relation between the dynamic spring constant in the vertical direction of the stopper rubber 15 in the contact state and the frequency, obtained from the actual product measurement result. The solid line in this figure shows the dynamic spring constant in the vertical direction obtained when only the first protruding portion 15a of the stopper rubber 15 of this embodiment comes into contact. The broken line in the figure shows the dynamic spring constant in the vertical direction obtained when a typical stopper rubber (see BACKGROUND ART) simultaneously molded on the engine bracket comes brought into contact. From the figure, it has been found that the stopper rubber 15 of this embodiment has a smaller dynamic spring constant than the typical stopper rubber.

Accordingly, the stopper rubber 15 having a small dynamic spring constant in the vertical direction in the contact state can be achieved.

—Advantages—

Thus, according to this embodiment, the distance between the protruding end face of the first protruding portion 15a and the contact surface 21d of the rear leg portion 21b is shorter in the longitudinal direction than the distance between the protruding end face of the second protruding portion 15c and the contact surface 21d in the longitudinal direction. Thus, when the input load in the longitudinal direction increases and exceeds the first predetermined load, only the first protruding portion 15a comes into contact with the contact surface 21d.

Here, the first protruding portion 15a is thicker in the longitudinal direction than the second protruding portion 15c. Thus, the first protruding portion 15a has a rubber volume and exhibits soft spring characteristics. Accordingly, the first protruding portion 15a is considerably deformed. Even if the first protruding portion 15a is deformed by coming into contact with the contact surface 21d of the rear leg portion 21b at the time of input of the load in the longitudinal direction, the non-contact state between the first protruding portion 15a and the second protruding portion 15c is maintained until the second protruding portion 15c comes into contact with the contact surface 21d. Thus, the deformation of the first protruding portion 15a continues. Accordingly, the stopper rubber 15 being in contact with the rear leg portion 21b can have a small dynamic spring constant in the vertical direction.

Then, when the input load in the longitudinal direction increases and exceeds the second predetermined load larger than the first predetermined load, the second protruding portion 15c also comes into contact with the contact surface 21d of the rear leg portion 21b.

Here, the second protruding portion 15c is thinner in the longitudinal direction than the first protruding portion 15a. Thus, the second protruding portion 15c does not have a rubber volume and exhibits hard spring characteristics. Accordingly, even when a heavy load is input in the longitudinal direction, the second protruding portion 15c, and hence the rubber elastic body 35, do not considerably deform, and the displacement of the power plant can be reduced.

Thus, the rear stopper rubber 15 being in contact with the rear leg portion 21b can have a small dynamic spring constant in the vertical direction, whereas, even when a heavy load is input in the longitudinal direction, the rubber elastic body 35 does not considerably deform, and the displacement of the power plant can be reduced.

In addition, the non-contact state between the first protruding portion 15a and the second protruding portion 15c is maintained at all times. Thus, even when the input load in the longitudinal direction exceeds the second predetermined load, the first protruding portion 15a does not deform so as to escape in the vertical direction. Thus, the rear stopper rubber 15 exhibits hard spring characteristics. Accordingly, even when a heavy load is input in the longitudinal direction, the displacement of the power plant can be reliably reduced.

In addition, the first rear end face 3e on which the first protruding portion 15a is formed is located in front of the second rear end face 3g on which the second protruding portion 15c is formed. Thus, the thickness in the longitudinal direction, and hence the rubber volume, of the first protruding portion 15a are maintained, whereas the protruding end face of the first protruding portion 15a can be in a more front position, compared with the case in which the first rear end face 3e is set in substantially the same position as that of the second rear end face 3g in the longitudinal direction. Thus, the space saving can be achieved while keeping a state in which the first protruding portion 15a exhibits soft spring characteristics.

In addition, the contact surface 21d of the rear leg portion 21b is a plane extending in the vertical direction, and thus the configuration of the contact surface 21d can be simplified.

Meanwhile, for example, when gear noise vibrations from the power plant in the vertical direction is transmitted to the vehicle body in a state in which the rear stopper rubber 15 is in contact with the rear leg portion 21b at the time of rapid acceleration of the vehicle, a muffled sound is generated.

Here, according to this embodiment, the stopper rubber 15 being in contact with the rear leg portion 21b can have a small dynamic spring constant in the vertical direction. Thus, a muffled sound can be reduced which is generated, for example, when gear noise vibrations from the power plant in the vertical direction is transmitted to the vehicle body in a state in which the rear stopper rubber 15 is in contact with the rear leg portion 21b at the time of rapid acceleration of the vehicle.

—First Variation—

The configurations of the rear attachment base portion 3c and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 7:
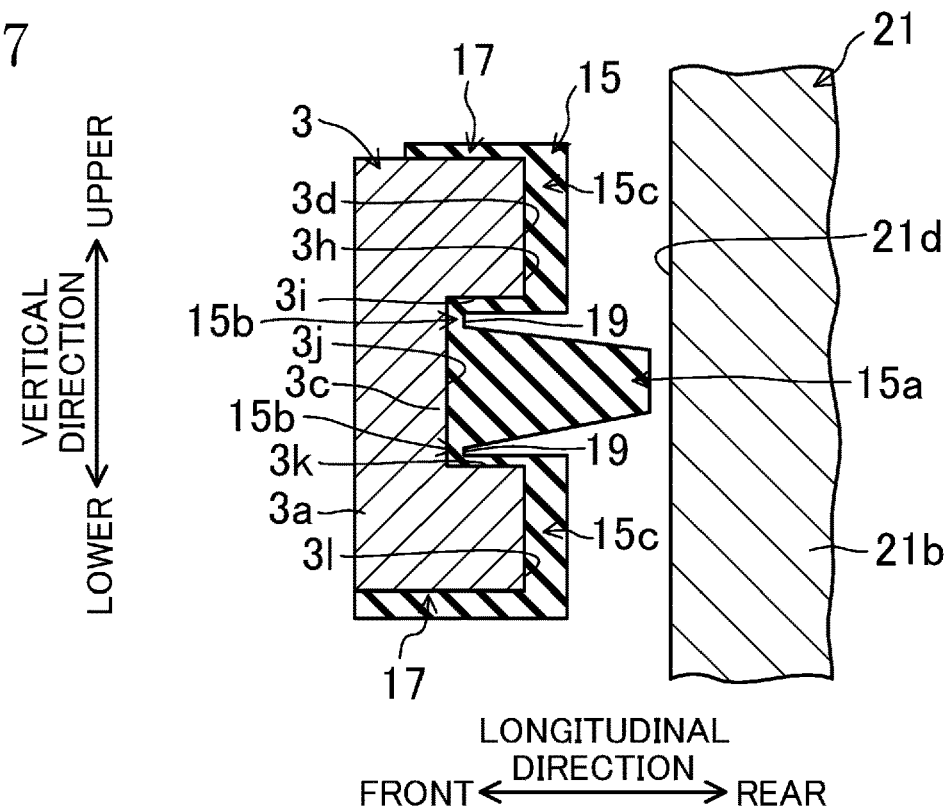
FIG. 7 is a view corresponding to FIG. 4 and schematically shows a vibration isolation structure according to a first variation.

As shown in FIG. 7, the rear attachment base portion 3c includes a rear end face 3d having: a first rear end face 3h being flat and extending in the vertical direction; a second rear end face 3j being continuous with a lower end portion of the first rear end face 3h via a step portion 3i, located in front of the first rear end face 3h, being flat, and extending in the vertical direction; and a third rear end face 3l being continuous with a lower end portion of the second rear end face 3j via a step portion 3k, located in substantially the same position as the first rear end face 3h in the longitudinal direction, being flat, and extending in the vertical direction.

A first protruding portion 15a has a substantially trapezoidal cross section protruding rearward from the second rear end face 3j of the rear attachment base portion 3c. Second protruding portions 15c each have a substantially rectangular cross section protruding rearward from the respective one of the first rear end face 3h and the second rear end face 3l of the rear attachment base portion 3c. The second protruding portions 15c include protruding end faces that are located in substantially the same position in the longitudinal direction. That is, the second protruding portions 15c come into contact with the contact surface 21d of the rear leg portion 21b substantially at the same time. The second protruding portion 15c is spaced apart in the vertical direction from the first protruding portion 15a so as to be in a non-contact state with the first protruding portion 15a. In other words, the second protruding portion 15c is disposed so that a groove portion 19 extending in the lateral direction is formed between the second protruding portion 15c and the first protruding portion 15a.

—Second Variation—

The configurations of the rear attachment base portion 3c and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 8:
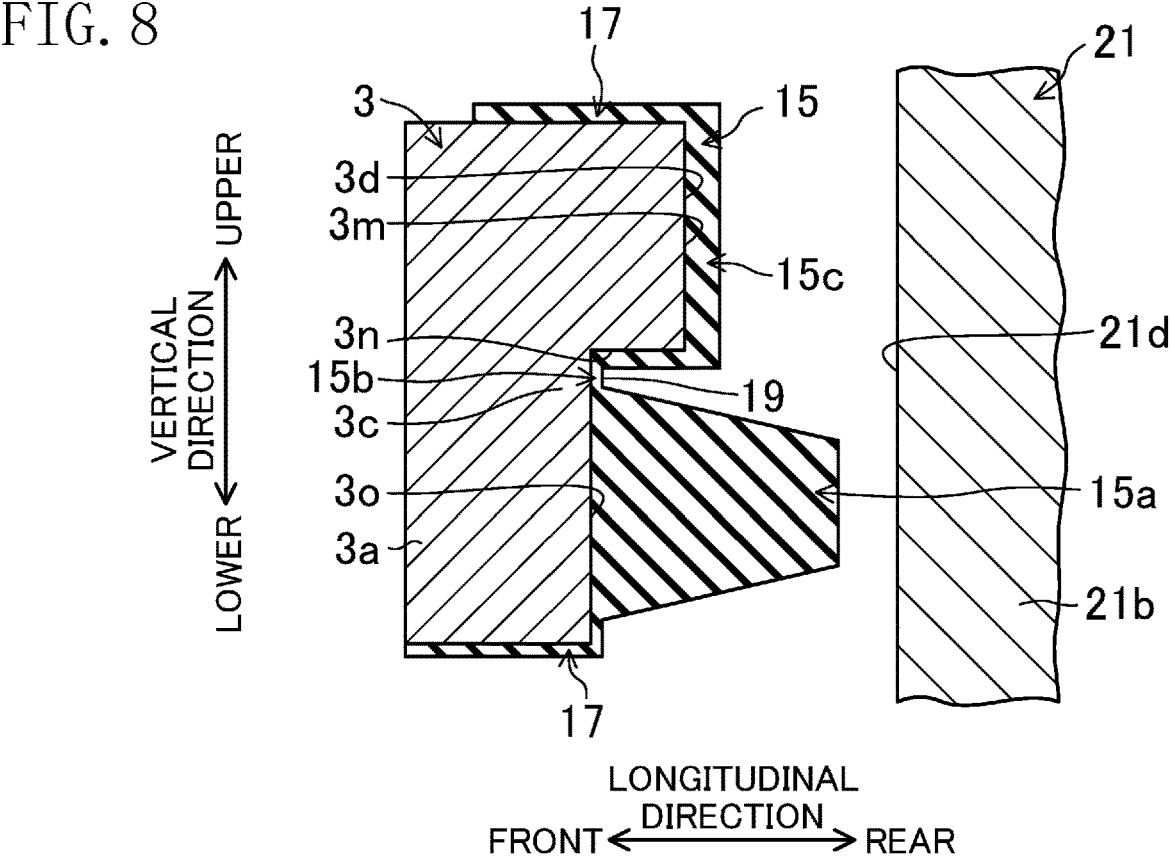
FIG. 8 is a view corresponding to FIG. 4 and schematically shows a vibration isolation structure according to a second variation.

As shown in FIG. 8, the rear attachment base portion 3c includes a rear end face 3d having: a first rear end face 3m being flat and extending in the vertical direction; and a second rear end face 3o being continuous with a lower end portion of the first rear end face 3m via a step portion 3n, located in front of the first rear end face 3m, being flat, and extending in the vertical direction. A first protruding portion 15a has a substantially trapezoidal cross section protruding rearward from the second rear end face 3o of the rear attachment base portion 3c. A second protruding portion 15c has a substantially rectangular cross section protruding rearward from the first rear end face 3m of the rear attachment base portion 3c.

—Third Variation—

The configurations of the rear attachment base portion 3c and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 9:
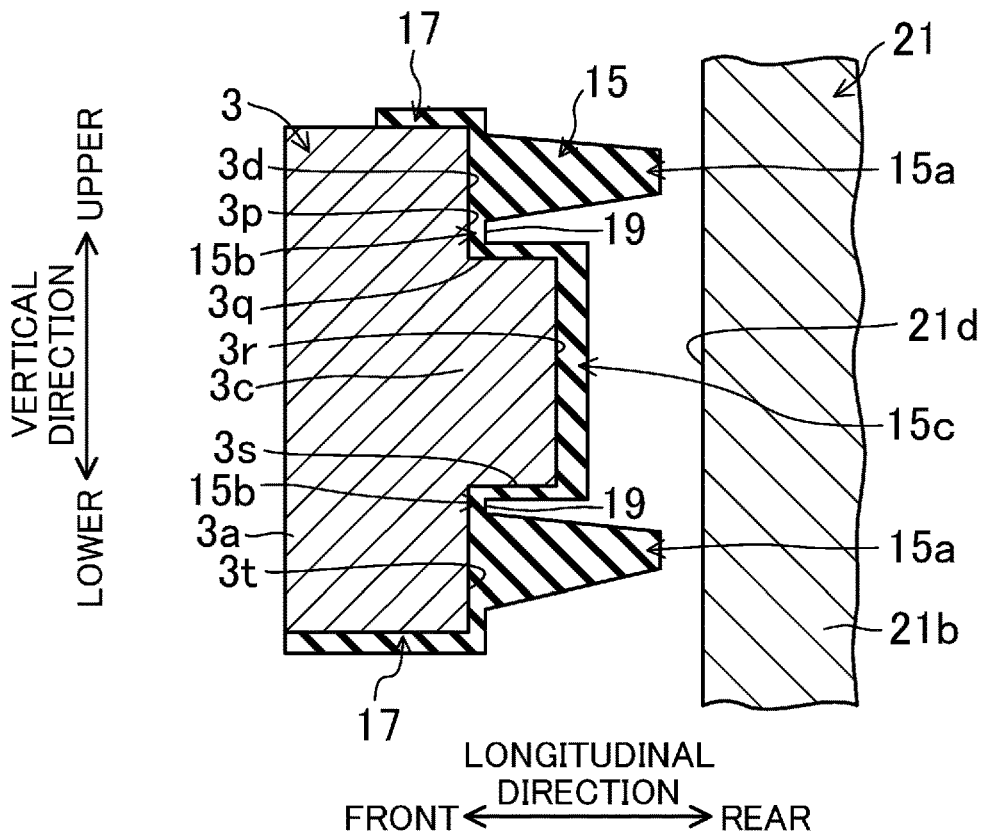
FIG. 9 is a view corresponding to FIG. 4 and schematically shows a vibration isolation structure according to a third variation.

As shown in FIG. 9, the rear attachment base portion 3c includes a rear end face 3d having: a first rear end face 3p being flat and extending in the vertical direction; a second rear end face 3r being continuous with a lower end portion of the first rear end face 3p via a step portion 3q, located behind the first rear end face 3p, being flat, and extending in the vertical direction; and a third rear end face 3t being continuous with a lower end portion of the second rear end face 3r via a step portion 3s, located in substantially the same position as the first rear end face 3p in the longitudinal direction, being flat, and extending in the vertical direction.

First protruding portions 15a each have a substantially rectangular cross section protruding rearward from the respective one of the first rear end face 3p and the third rear end face 3t of the rear attachment base portion 3c. The first protruding portions 15a include protruding end faces that are located in substantially the same position in the longitudinal direction. That is, the first protruding portions 15a come into contact with the contact surface 21d of the rear leg portion 21b substantially at the same time. A second protruding portion 15c has a substantially rectangular cross section protruding rearward from the second rear end face 3r of the rear attachment base portion 3c. The second protruding portion 15c is spaced apart in the vertical direction from the first protruding portion 15a so as to be in a non-contact state with the first protruding portion 15a. In other words, the second protruding portion 15c is disposed so that a groove portion 19 extending in the lateral direction is formed between the second protruding portion 15c and the first protruding portion 15a.

—Fourth Variation—

The configurations of the rear leg portion 21b, the rear attachment base portion 3c, and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 10:
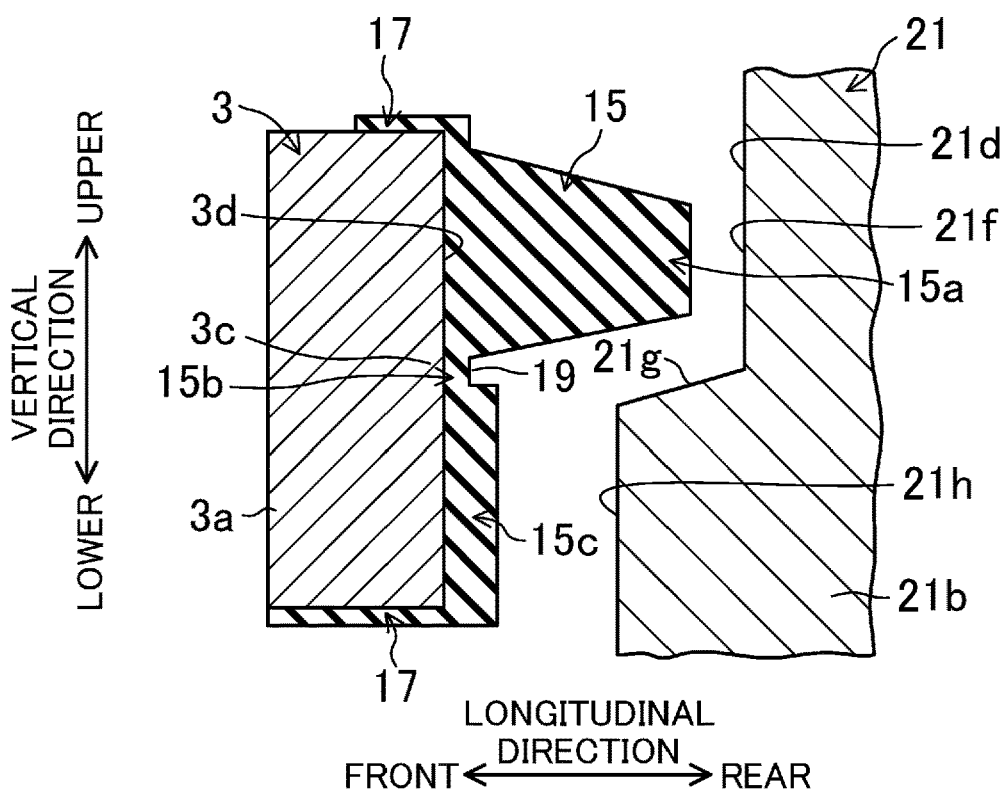
FIG. 10 is a view corresponding to FIG. 4 and schematically shows a vibration isolation structure according to a fourth variation.

As shown in FIG. 10, the rear leg portion 21b includes a contact surface 21d having a first contact surface 21f being flat and extending in the vertical direction; and a second contact surface 21h being continuous with a lower end portion of the first contact surface 21f via a step portion 21g, located in front of the first contact surface 21f, being flat, and extending in the vertical direction. The rear attachment base portion 3c includes a rear end face 3d that is a plane extending in the vertical direction. A first protruding portion 15a has a substantially trapezoidal cross section protruding rearward from an upper portion of the rear face 3d of the rear attachment base portion 3c. A second protruding portion 15c has a substantially rectangular cross section protruding rearward from a lower portion of the rear face 3d of the rear attachment base portion 3c.

—Fifth Variation—

The configurations of the rear leg portion 21b, the rear attachment base portion 3c, and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 11:
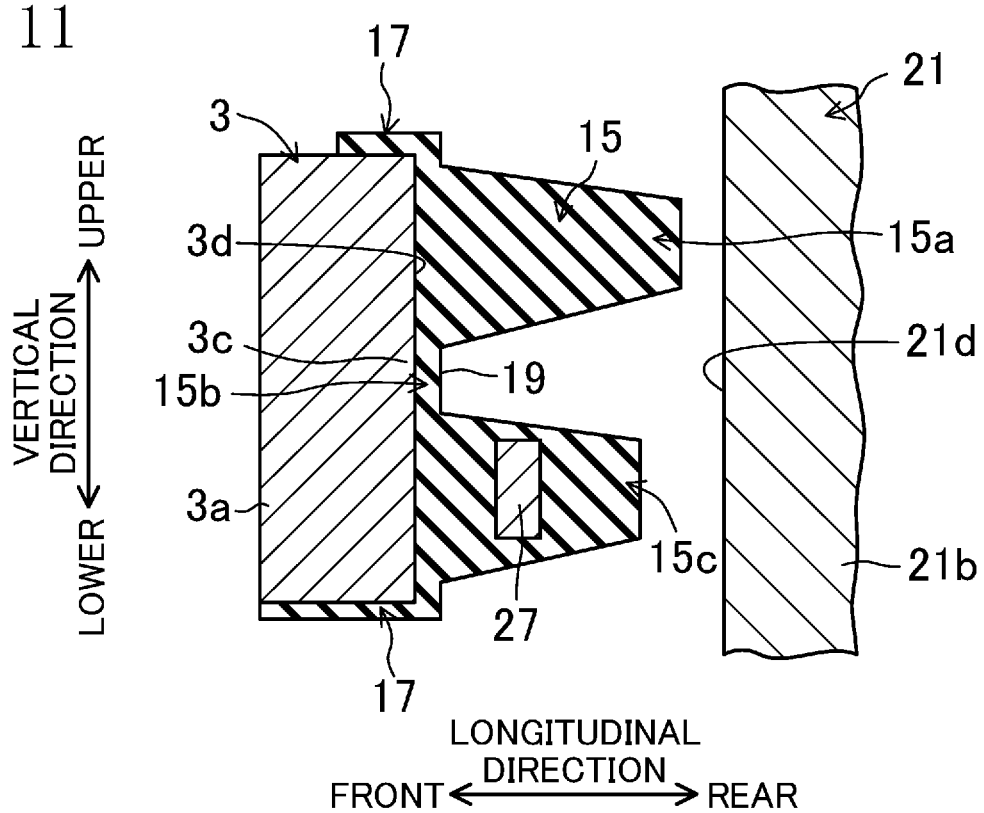
FIG. 11 is a view corresponding to FIG. 4 and schematically shows a vibration isolation structure according to a fifth variation.

As shown in FIG. 11, the rear attachment base portion 3c includes a rear end face 3d that is a plane extending in the vertical direction. A first protruding portion 15a has a substantially trapezoidal cross section protruding rearward from an upper portion of the rear end face 3d of the rear attachment base portion 3c. A second protruding portion 15c is a large block having a substantially rectangular cross section protruding rearward from a lower portion of the rear end face 3d of the rear attachment base portion 3c. A metallic reinforcement member 27 having a substantially rectangular cross section is embedded in the second protruding portion 15c. Thus, the second protruding portion 15c exhibits hard spring characteristics while having a rubber volume. In addition, the durability of the second protruding portion 15c can be improved.

—Sixth Variation—

The configurations of the rear attachment base portion 3c and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 12:
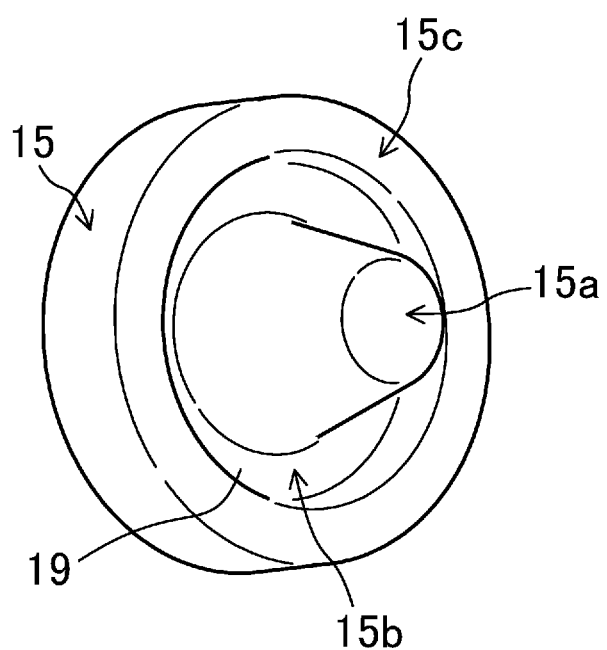
FIG. 12 is a perspective view showing a rear stopper rubber of a vibration isolation structure according to a sixth variation.

The rear attachment base portion 3c includes a rear end face 3d that is a plane extending in the vertical direction (not shown). As shown in FIG. 12, a first protruding portion 15a has a substantially cone shape protruding rearward from a center portion of the rear end face 3d of the rear attachment base portion 3c. A second protruding portion 15c has a substantially cylindrical shape being continuous with an end portion (a front end portion) on a side opposite to the protruding side of the first protruding portion 15a via a covered portion 15b, protruding rearward from the rear end face 3d of the rear attachment base portion 3c, and surrounding the first protruding portion 15a. The second protruding portion 15c is disposed substantially coaxially with the first protruding portion 15a. The second protruding portion 15c is spaced apart in the radial direction from the first protruding portion 15a so as to be in a non-contact state with the first protruding portion 15a. In other words, the second protruding portion 15c is disposed so that a circular groove portion 19 is formed between the second protruding portion 15c and the first protruding portion 15a.

—Seventh Variation—

The configurations of the rear leg portion 21b and the rear stopper rubber 15 of this variation are different from those of the above-described exemplary embodiment, but the other configurations are the same as those of the above-described exemplary embodiment. Thus, in the following, the overlapping descriptions of the same components as those of the above-described exemplary embodiment might be omitted.

Figure 13:
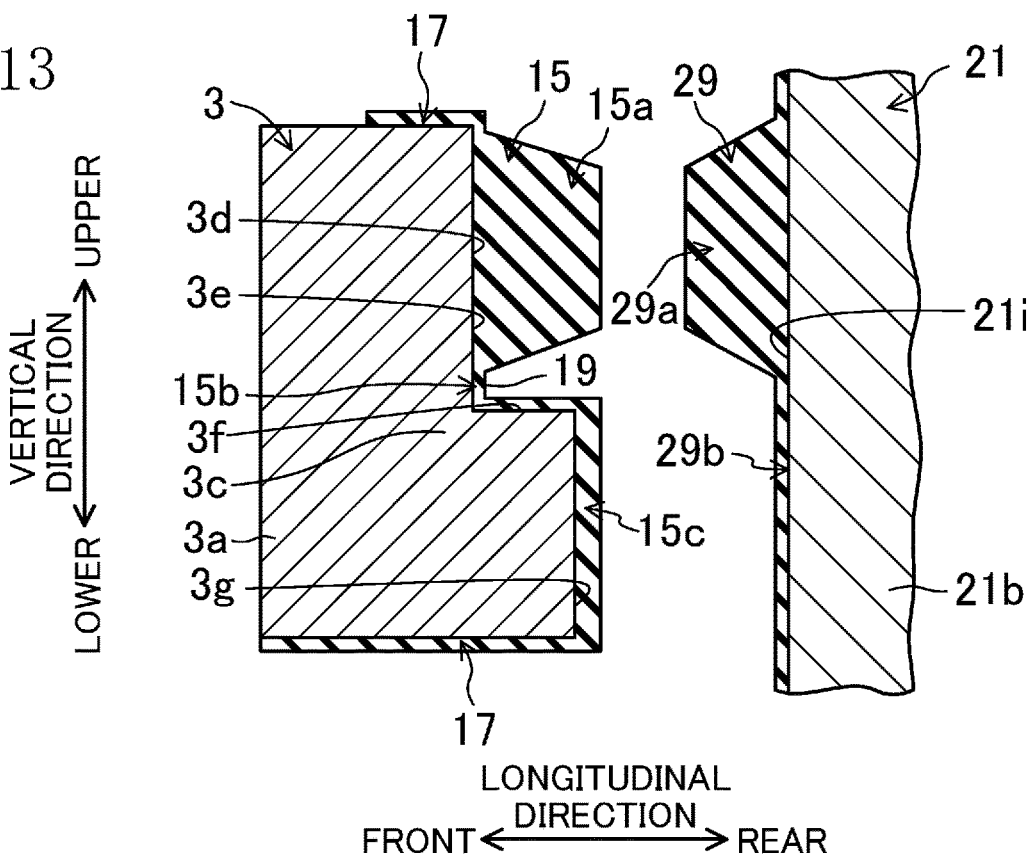
FIG. 13 is a view corresponding to FIG. 4 and schematically shows a vibration isolation structure according to a seventh variation.

As shown in FIG. 13, the rear leg portion 21b includes an inner surface. All or part of the inner surface serves as a formation surface 21i facing the rear stopper rubber 15 in the longitudinal direction. This formation surface 21i is a plane extending in the vertical direction. A stopper rubber 29 is formed on the formation surface 21i. This stopper rubber 29 includes a first protruding portion 29a protruding frontward from an upper portion of the formation surface 21i and having a substantially trapezoidal cross section extending in the lateral direction, and a second protruding portion 29b protruding frontward from a lower portion of the formation surface 21i and having a substantially rectangular cross section extending in the lateral direction. The second protruding portion 29b is thinner in the longitudinal direction than the first protruding portion 29a and has a smaller cross-sectional area than the first protruding portion 29a. That is, the first protruding portion 29a is relatively thicker and has a relatively larger cross-sectional area. Thus, the first protruding portion 29a has a rubber volume and exhibits soft spring characteristics. In contrast, the second protruding portion 29b is relatively thinner and has a relatively smaller cross-sectional area. Thus, the second protruding portion 29b does not have a rubber volume and exhibits hard spring characteristics. A protruding end face (a front end face), of the first protruding portion 29a, extending in the vertical direction is located, in the longitudinal direction, in front of a protruding end face, of the first protruding portion 29b, extending in the vertical direction.

A first protruding portion 15a of the rear stopper rubber 15 has a substantially trapezoidal cross section facing the first protruding portion 29a of the stopper rubber 29 in the longitudinal direction. A second protruding portion 15c of the rear stopper rubber 15 is disposed to face the second protruding portion 29b of the stopper rubber 29 in the longitudinal direction. The second protruding portions 15c include a protruding end face that is located in substantially the same position in the longitudinal direction as that of the first protruding end 15a.

The distance between the protruding end face of the second protruding portion 15c of the rear stopper rubber 15 and the protruding end face of the second protruding portion 29b of the stopper rubber 29 is longer in the longitudinal direction than the distance between the protruding end face of the first protruding portion 15a of the rear stopper rubber 15 and the protruding end face of the first protruding portion 29a of the stopper rubber 29. In other words, the attachment bracket 21 and the stopper rubber 29 constitute a contact member on the vehicle body side, and the protruding end faces of the first protruding portion 29a and the second protruding portion 29b of the stopper rubber 29 constitute a contact surface, of the contact member, with which the first protruding portion 15a and the second protruding portion 15c of the rear stopper rubber 15 come into contact when the load is input in the longitudinal direction.

Thus, according to this variation, the contact member on the vehicle body side includes the rear leg portion 21b having the formation surface 21i facing the rear stopper rubber 15 in the longitudinal direction, and the stopper rubber 29 formed on the formation surface 21i. Thus, the thickness in the longitudinal direction and also the rubber volume of the rear stopper rubber 15 (in particular, the first protruding portion 15a) can be made smaller compared with the case in which the contact member does not include the stopper rubber 29. Thus, the durability of the rear stopper rubber 15 (in particular, the first protruding portion 15a) can be improved.

—Eighth Variation—

Figure 14:
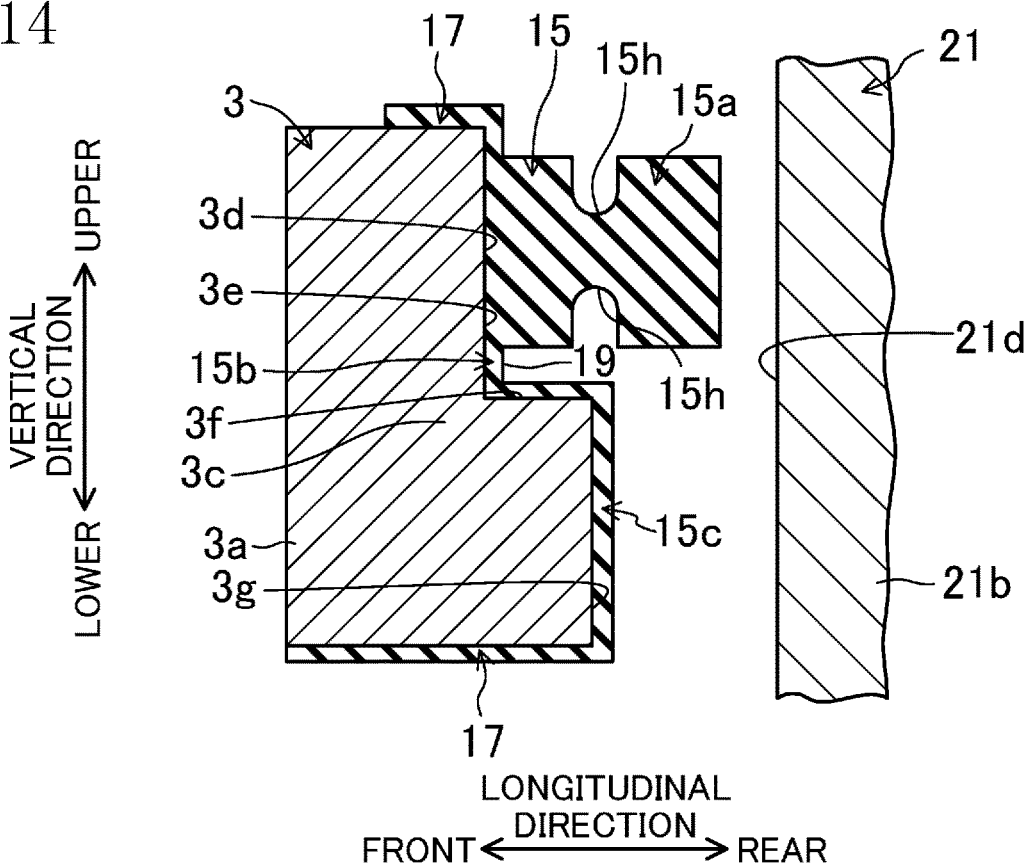
FIG. 14 is a view corresponding to FIG. 4 and schematically shows a vibration isolation structure according to an eighth variation.

The configuration of the rear stopper rubber 15 of this variation is different from that of the above-described exemplary embodiment, but the other configurations are the same as those of the above-described exemplary embodiment. Thus, in the following, the overlapping descriptions of the same components as those of the above-described exemplary embodiment might be omitted. As shown in FIG. 14, a first protruding portion 15a includes upper and lower surfaces on each of which a groove portion 15h extending in the lateral direction is formed.

—Ninth Variation—

The configuration of the rear stopper rubber 15 of this variation is different from that of the above-described exemplary embodiment, but the other configurations are the same as those of the above-described exemplary embodiment. Thus, in the following, the overlapping descriptions of the same components as those of the above-described exemplary embodiment might be omitted. As shown in FIG. 15, a first protruding portion 15a has a substantially trapezoidal cross section. The first protruding portion 15a include a protruding end face having groove portions 15d each having a bottom portion that is located in substantially the same position in the longitudinal direction as that of a protruding end face of the second protruding portion 15c.

(Other Exemplary Embodiments)

In the above-described exemplary embodiment and the above-described variations, the vibration isolation structure V is adopted for the liquid-filled type vibration isolation device 1, but alternatively, may be adopted for an engine mount other than the liquid-filled type vibration isolation device 1.

In the above-described exemplary embodiment and the above-described variations, the main load input direction is the longitudinal direction, but alternatively, may be the lateral direction.

In the above-described exemplary embodiment and the above-described variations, the stopper rubbers 13, 15, 17 and the rubber elastic body 35 are simultaneously molded on the engine bracket 3, but alternatively, for example, the stopper rubbers 13, 15, 17 may be attached on the engine bracket 3 later.

In the above-described exemplary embodiment and the above-described variations, the first protruding portion 15a and the second protruding portion 15c are formed on the rear end face 3d of the rear attachment base portion 3c, but alternatively, for example, may be formed on the front end face of the front attachment portion 3c instead of or in addition to the rear end face 3d of the rear attachment base portion 3c, in order to restrict the longitudinal deformation of the rubber elastic body 35 at the time of a rapid acceleration of the vehicle.

In the above-described exemplary embodiment and the above-described variations, the first protruding portion 15a and the second protruding portion 15c have a substantially rectangular or trapezoidal cross section, but alternatively, for example, the second protruding portion 15c may have a substantially semicircular cross section.

In the above-described exemplary embodiment and the above-described variations, the non-contact state between the first protruding portion 15a and the second protruding portion 15c is maintained at all times, but this non-contact state only has to be maintained until the input load in the longitudinal direction exceeds the second predetermined load and the second protruding portion 15c comes into contact with the contact surface 21d etc.

In the above-described exemplary embodiment and the above-described variations, the first protruding portion 15a and the second protruding portion 15c are integrated via the covered portion 15b, but alternatively, for example, may be separated.

In addition, the above-described exemplary embodiments and the above-described variations can be combined as appropriate unless departing from the concept of the present disclosure.

(Reference Example)

In the above-described exemplary embodiment and the above-described variations, the first protrusion 15a and the second protrusion 15c of the stopper rubber 15 are formed on the rear end face 3d of the rear attachment base portion 3c, and the contact surface 21d with which the first protruding portion 15a and the second protruding portion 15c come into contact when the load is input in the longitudinal direction is formed on the inner surface of the rear leg portion 21b. Alternatively, for example, the first protruding portion and the second protruding portion may be formed only on an inner surface of at least one of the pair of front and rear legs 21b of the attachment bracket 21, and the contact surface with which the first protruding portion and the second protruding portion come into contact when the load is input in the longitudinal direction may be formed on the outer surface, in the longitudinal direction, of the attachment base portion 3c facing that inner surface in the longitudinal direction.

As described above, the present disclosure is applicable to a vibration isolation structure or the like.

What is claimed is:

1. A vibration isolation structure, comprising:
a first attachment member attached to a vibration origin side;
a second attachment member attached to a vibration receiving side, wherein a main load input direction is in a longitudinal direction from the first attachment member to the second attachment member;
a rubber elastic body provided between the first attachment member and the second attachment member;
a stopper portion
made of rubber,
provided on an end face of the first attachment member closer to an outside in the main load input direction, and
restricting deformation of the rubber elastic body in the main load input direction; and
a contact member
provided on the vibration receiving side and
having a contact surface
which faces the stopper portion in the main load input direction and
which the stopper portion comes into contact with at a time of input of a load in the main load input direction,
wherein
the stopper portion includes
a first protruding portion
protruding longitudinally from the end face of the first attachment portion closer to the outside in the main load input direction toward the outside in the main load input direction, and
a second protruding portion
protruding longitudinally from the end face of the first attachment portion closer to the outside in the main load input direction toward the outside in the main load input direction,
being spaced apart from the first protruding portion so as to be in a non-contact state with the first protruding portion,
being thinner than the first protruding portion in the main load input direction, and
having a protruding end in which a distance between the protruding end and the contact surface is longer in the main load input direction than a distance between a protruding end of the first protruding portion and the contact surface, and
when the first protruding portion is deformed by coming into contact with the contact surface at a time of input of a longitudinal load in the main load input direction, the non-contact state between the first protruding portion and the second protruding portion is maintained at least until the second protruding portion comes into contact with the contact surface.

2. The vibration isolation structure of claim 1, wherein in the stopper portion, the non-contact state between the first protruding portion and the second protruding portion is maintained at all times.

3. The vibration isolation structure of claim 1, wherein the end face, of the first attachment member closer to the outside in the main load input direction, on which the stopper portion is formed includes
a first end face on which the first protruding portion is formed, and
a second end face which is located in an outer side with respect to the main load input direction than the first end face, and on which the second protruding portion is formed.

4. The vibration isolation structure of claim 1, wherein the contact surface is a plane extending in a direction orthogonal to the main load input direction.

5. The vibration isolation structure of claim 1, wherein the contact member includes a member provided on the vibration receiving side and including a formation surface facing the stopper portion in the main load input direction, and a stopper rubber formed on the formation surface, and
the stopper rubber includes a protruding end face which serves as the contact surface.

6. The vibration isolation structure of claim 1, wherein the vibration origin side is an engine side,
the vibration receiving side is a vehicle body side,
the main load input direction is a longitudinal direction of a vehicle, and
the stopper portion is provided on the end face of the first attachment member closer to a rear of the vehicle.

7. The vibration isolation structure of claim 1, further comprising ridge portions formed on a protruding end face of the first protruding portion and on a protruding end face of the second protruding portion so as to form groove portions.

* * * * *